United States Patent [19]

Marcoux et al.

[11] Patent Number: 4,473,054
[45] Date of Patent: * Sep. 25, 1984

[54] DIESEL FUEL FILTER SYSTEM

[75] Inventors: Leo Marcoux, Rehoboth, Mass.; Youn Ting, Lexington, Ky.

[73] Assignee: Texas Instruments Incorporated, Dallas, Tex.

[*] Notice: The portion of the term of this patent subsequent to Jun. 14, 2000 has been disclaimed.

[21] Appl. No.: 466,460

[22] Filed: Feb. 15, 1983

Related U.S. Application Data

[62] Division of Ser. No. 204,965, Nov. 7, 1980, Pat. No. 4,387,691.

[51] Int. Cl.³ .......................................... F02M 31/00
[52] U.S. Cl. .................................... 123/557; 210/184; 123/549
[58] Field of Search ............... 123/549, 552, 553, 557; 210/184, 185, 186; 219/205, 206, 207, 301, 306, 307, 528, 548, 549

[56] References Cited

U.S. PATENT DOCUMENTS

| | | | |
|---|---|---|---|
| 2,839,196 | 6/1958 | Schwalge | 210/184 |
| 4,091,265 | 5/1978 | Richards | 210/184 |
| 4,318,384 | 3/1982 | Moffet | 123/549 |
| 4,327,697 | 5/1982 | Wada | 123/549 |
| 4,359,974 | 11/1982 | Igashira | 123/549 |
| 4,361,125 | 11/1982 | Igashira | 123/549 |
| 4,387,291 | 6/1983 | Keppel | 123/549 |

Primary Examiner—Ronald H. Lazarus
Attorney, Agent, or Firm—James P. McAndrews; John A. Haug; Melvin Sharp

[57] ABSTRACT

A heater system for a diesel fuel filter comprises a housing, a self-regulating electrical resistance heater element of positive temperature coefficient of resistivity arranged in heat-transfer relation to thermally conducting components to form a heater means, the heater means being mounted within the housing so that diesel fuel passes directly over and around the various thermally conducting components of the heater means to elevate the temperature of the fuel as it passes to the filter to deter clogging of the filter by paraffin or other fuel components which may solidify in the fuel at lower temperatures, and electrically conducting means which extend from the housing in sealed relation to the housing for electrically connecting the heater means to a source of electrical power.

2 Claims, 4 Drawing Figures

DIESEL FUEL FILTER SYSTEM

This application is a division, 204,965 filed Nov. 7, 1980, now U.S. Pat. No. 4,387,691.

BACKGROUND OF THE INVENTION

The field of this invention is that of diesel fuel filter systems and the invention relates more particularly to a system which is adapted for use in passenger automobiles.

With the present energy crises extending world-wide, the use of diesel-powered passenger automobiles is rapidly increasing. As a result, diesel engines have to be adapted for more trouble-free operation by drivers who may not provide routine maintenance such fuel filter replacement and the like with the same degree of care as professional drivers and who may be unable to cope with problems such as fuel filter clogging which may occur. At the same time, it would be desirable to lower the cost of diesel-powered automobiles to reach the larger popular market which is becoming interested in such vehicles and to adopt the diesel-powered automobiles to incorporate the various, power-operated automobile convenience features to which the popular market has become accustomed. In this regard, it is found that although diesel fuel as manufactured is intended to have low boiling point constituents removed from the fuel, paraffin residues and the like which may remain in the fuel can solidify in the fuel in the fueltank or filter housing when diesel powered automobiles or other equipment stand idle during cold weather. Then, when operation of the engine is initiated, such solidified components of the fuel tend to clog the filter as the fuel passing to the engine is filtered for removing extraneous contaminant particles and the like. In many cases such filter-clogging solidified fuel components will be returned to liquid state and passed through the filter to the engine as engine warm up gradually takes place. Frequently, however, such clogging will sufficiently reduce fuel flow so that engine performance is adversely affected during the initial period of engine operation. This can result in considerable driver inconvenience particularly where routine filter replacement may have been disregarded or where the filter clogging is not recognized or understood due to driver inexperience.

It will be desirable to be able to avoid such cold weather filter clogging particularly if such an improvement could be achieved at reasonable cost in a manner which would not involve undue drain on the electrical power supply capacity of the automobile.

It is an object of this invention to provide a novel and improved diesel fuel filter system; to provide such a diesel fuel filter system which is free from cold weather filter clogging; to provide such a system which utilizes low cost components adapted to be incorporated in an otherwise conventional fuel filter system; to provide such a filter system which is operable without excessively loading the electrical power supply capacity of the automobile or other diesel-powered equipment; and to provide such a system which can be used without risk of fuel overheating and the like.

BRIEF SUMMARY OF THE INVENTION

Briefly described, the novel and improved diesel fuel filter system of this invention comprises conventional filter means which are mounted in a conventional filter housing in a customary manner for filtering diesel fuel as it is passed to the engine. That is, the system preferably incorporates a first fixed housing part mounted on a diesel engine to provide inlet and outlet means connected to the fuel supply system of the engine. The fixed housing part includes an externally threaded outlet tube or stud located on the fixed housing part to extend axially through an open-ended housing chamber concentric with a gasket seat extending around the open chamber end. A conventional filter unit enclosed in a filter can is threadedly attached to the stud for drawing a can gasket against the gasket seat, thereby to position the filter unit so that it receives diesel fuel flow entering the fuel inlet and passes that fuel flow through the filter unit to the outlet tube during engine operation. In accordance with this invention, self-regulating electrical resistance heater means preferably including ceramic heater elements of a material of positive temperature coefficient of resistivity (PTC) are arranged, preferably within the fixed housing part, so that the heater means increase the temperature of the fuel passing through the filter unit, thereby to deter any clogging of the filter which might otherwise be due to solidifying of paraffin or other components of the fuel at relatively lower temperatures. Preferably, the heater means is disposed so that fuel flowing into the inlet passes directly over the heater means in heat-transfer relation to the heater elements and other heater components as the fuel is passed into the filter unit.

In a preferred embodiment of the invention, ceramic PTC heater elements are disposed with first sides of the elements in electrically and thermally conductive relation with an annular, electrically and thermally conductive plate. Support means, preferably of an electrical insulating material are mounted on the plate over the heater elements for holding electrically and thermally conductive spring means in electrically and thermally conductive relation to opposite sides of the ceramic heater elements. Preferably, the annular plate and the support means are apertured to permit fluid flow through the plate and support means. The annular plate is then secured in electrically conductive relation to the fixed housing part around the noted outlet tube or stud for mounting the heater means in the housing chamber. The mounting of the annular plate also preferably serves to electrically ground the heater elements. Terminal means are arranged to extend into the fixed housing part in electrically insulated relation to the housing part and are electrically connected to the spring means for electrically connecting the heater means in an electrical circuit, whereby the heater means are operable upon initiation of operation of the diesel engine.

In that arrangement, the heater means are easily and economically manufactured but are easily mounted in otherwise conventional filter housing means so that diesel fuel flowing into the housing means as engine operation is initiated is increased in temperature as the fuel passes into a conventional filter unit, thereby to deter any clogging of the conventional unit by paraffins or other fuel components which may tend to solidify in the fuel at relatively lower temperatures. In that arrangement, any paraffins or the like which may have settled in the filter unit before engine operation was initiated also tend to be returned to liquid state and to pass through the filter unit to the engine before engine operation is adversely affected.

In a preferred embodiment of the fuel filter system of this invention, the filter means are mounted in heat-transfer relation to the engine for facilitating heating of the fuel passing through the filter system as the engine warms up. In one preferred embodiment of the invention, thermally responsive switch means are mounted in the system for interrupting operation of the heater means when the temperature of the switch means is above a selected temperature either due to ambient temperature or engine warm-up conditions. In that way, power consumption by the heater is avoided when it is unnecessary and unnecessary heating of the fuel which may be undesirable on a warm day is avoided.

DESCRIPTION OF THE DRAWINGS

Other objects, advantages and details of the novel and improved diesel fuel filter system of this invention appear in the following detailed description of preferred embodiments of the invention, the detailed description referring to the drawings in which.

DESCRIPTION OF THE PREFERRED EMBODIMENTS

Figure 1:
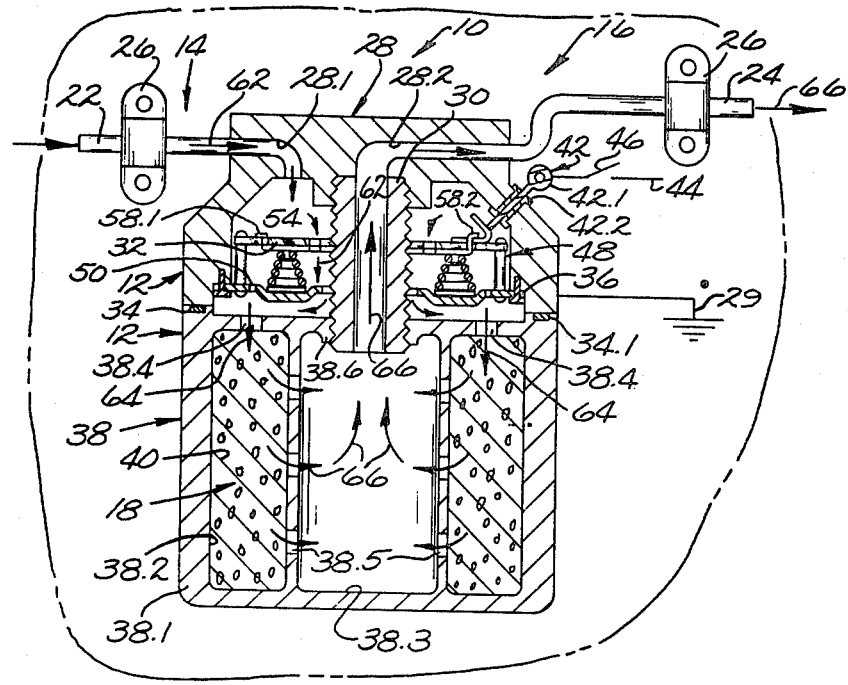
FIG. 1 is an axial section view through the diesel fuel filter system of this invention.
Figure 2:
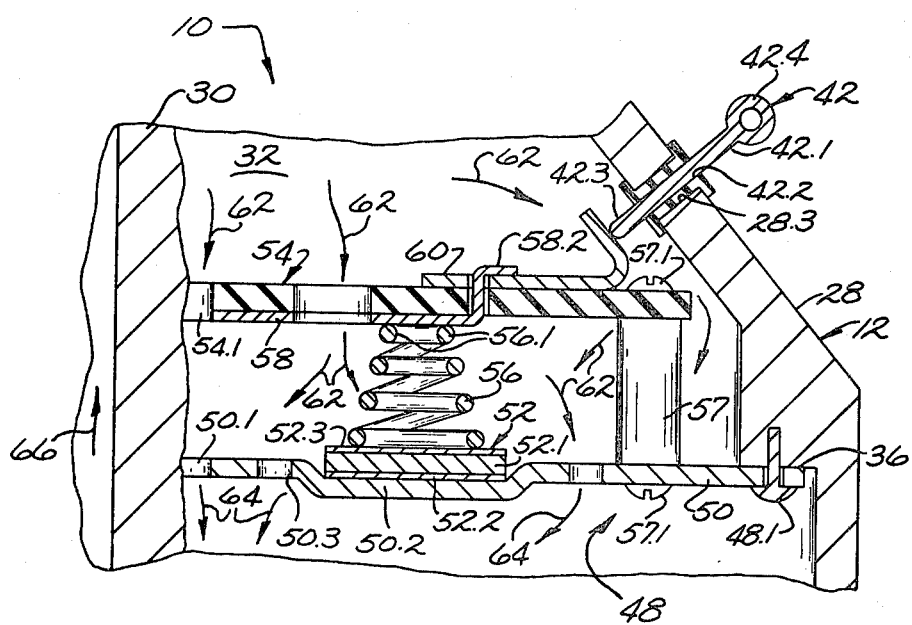
FIG. 2 is a partial section view similar to FIG. 1 to greatly enlarged scale.

Referring to the drawings, 10 in FIGS. 1-2 indicates a preferred embodiment of the novel and improved diesel fuel filter system of this invention which is shown to include housing means 12 having inlet means 14 and outlet means 16 and having filter means 18 which are mounted on a diesel engine as is diagrammatically indicated by the broken lines 20 in FIG. 1. The system is arranged for receiving diesel fuel from a fuel supply tank as is diagrammatically indicated by the fuel line 22 in FIG. 1 and for passing that fuel through the system to the engine as is diagrammatically indicated in FIG. 1 by the fuel line 24. Preferably, the filter system 10 is secured in selected heat-transfer relation to the engine as is diagrammatically shown by the brackets 26 in FIG. 1 so that the system gradually heats up to a normal running temperature of the system within 5 to 15 minutes as the engine warms up after initiation of engine operation.

In a preferred embodiment of this invention as shown in FIGS. 1 and 2, the filter housing 12 preferably includes a fixed housing part 28 having inlet and outlet openings 28.1 and 28.2. The fixed housing part preferably comprises a metal casting or the like electrically connected to the engine and to electrical ground as is diagrammatically indicated at 29 in FIG. 1. An externally threaded tube or stud 30 is threadedly engaged in the outlet opening 28.2 in any conventional way so that the stud extends axially from the center of the fixed housing part through the open-ended housing chamber 32 concentric with a gasket seat 34 which extends around the rim of the open end of the chamber. A shoulder 36 or other mounting step or the like is preferably provided on the inner surface of the fixed housing part inside the chamber 32. A conventional diesel fuel filter unit 38 as illustrated in FIG. 2 preferably has a can 38.1 with a circumferentially extending chamber 38.2 enclosing any conventional fuel filter media such as a cellulose fiber pad 40 or the like. The filter unit 38 also has a central chamber 38.3 aligned with the stud 30 and has openings 38.4 and 38.5 leading respectively into and out of the circumferential chamber 38. The can further has a threaded sleeve part 38.6 threadedly engaged with the stud 30 for detachably securing the filter can to the fixed housing part so that it is easily replaced in conventional manner and for drawing the filter can into sealed relation to the gasket seat 34 with the gasket 34.1 held in sealing relation therebetween.

In one preferred embodiment of this invention as shown in FIGS. 1 and 2, terminal means 42 are preferably mounted on the fixed housing part 28 to extend out of the housing in electrically insulated relation to the housing. Preferably for example, a terminal stud 42.1 is encased in a sleeve 42.2 of electrical insulating material and is press-fitted, cemented or otherwise secured in an opening 28.3 in the housing part so that the terminal effectively seals off the opening 28.3 and so that the end 42.3 of the terminal stud is accessible from inside the chamber 32 as the opposite end 42.4 of the stud extends outside the housing to be connected in an electrical circuit. Typically for example, the terminal 42 is electrically connected to the conventional electrical power source 44 of the diesel engine through ignition switch means 46 or the like as is diagrammatically illustrated in FIG. 1.

In a preferred embodiment 10 of the system of this invention, self-regulating electrical resistance heater means 48 are mounted in the system for increasing the temperature of diesel fuel passing through the filter media 40, thereby to deter clogging of the filter media by solidified, low boiling point constituents of the fuel such as paraffins or the like. Preferably for example, the heater means incorporates an annular plate 50 of copper or aluminum or other thermally and electrically conductive metal material. The plate preferably has a central opening 50.1 to fit around the stud 30, has recesses or embossments 50.2 formed in the plate, and has a selected apertures 50.3 for permitting fluid flow through the plate.

A plurality of electrical resistance heater elements 52 are mounted on the annular plate to be connected in an electrical circuit. Preferably for example, each heater element comprises a disc 52.1 of a ceramic material such as lanthanum-doped barium titanate or the like which is adapted to display a positive temperature coefficient of resistivity (PTC). The outer side surfaces of the ceramic body are preferably metallized as illustrated at 52.2 and 52.3 to provide ohmic contacts to the ceramic body and the heater disc elements are disposed in the plate recesses 50.2 so that the contact layers 52.2 at one side of the elements are disposed in electrically and thermally conductive relation with the plate 50.

A support or frame means 54 is secured to the annular plate spaced over the heater elements for holding thermally and electrically conductive springs 56 in electrically and thermally conducting relation to the electrical contacts 52.3 on the opposite sides of the heater elements. Preferably for example, the frame or support 54 is formed of fiber board or the like and spacers 57 are secured to the fiber board and to the annular plate by screws 57.1 or the like for mounting the frame over the plate in spaced relation to the plate. A conductor 58 of copper or the like has tabs 58.1 and 58.2 engaged in apertures in the fiber board to hold the conductor plate at one side of the frame. One tab 58.2 of the conductor is also preferably extended through a corresponding opening in a resilient terminal blade 60 formed of conductive beryllium copper or the like to secure the resilient blade to the opposite side of the frame. The conductive springs 56 are preferably welded or soldered to the conductor plate 58 as indicated at 56.1 in FIG. 2. In that arrangement, the frame or support holds the thermally and electrically conductive springs 56 in position to electrically engage the heater elements 52. Preferably, the frame is provided with a central opening 54.1 to fit around the stud 30 and also has apertures 54.2 permitting fluid to flow through the frame.

In accordance with this invention, the heater means 48 are secured in housing chamber 32 on the mounting step 36 by means of mounting screws 48.1 which secure the annular metal plate 50 in electrically conductive relation to the housing part 28 while also disposing the terminal 60 so that it resiliently engages the terminal 42 as is best shown in FIG. 2. In that arrangement, the heater elements 52 are connected in an electrical circuit to be electrically energized. That is, when the ignition switch 46 is closed to initiate operation of the engine 20, electrical current is directed from the power source 44 through the terminal 42, the resilient terminal 60, the conductor plate 58, the springs 56 and the contact layers 52.3 to the electrical resistance heater bodies 52.1 and from the contact layers 52.2, through the plate 50 and the housing 28 to electrical ground. Accordingly, the heater elements 52 generate a substantial amount of heat and, as the elements are self heated, the elements also increase in resistivity to self regulate or stabilize the heater element temperature at a safe level. When diesel fuel begins to flow to the engine as engine operation is started, the fuel flows into the inlet 28.1 and passes through the openings and apertures in the frame and in the annular plate and pass in close heat transfer relation to the heater elements, the plate 50, and the springs 56 as the fuel flows directly over those components of the heater means as is indicated in FIGS. 1 and 2 by the arrows 62. That fuel is therefore increased in temperature as it passes into the filter media 40 as indicated by the arrows 64. Such heating therefore deters clogging of the filter media by any solidified components of the fuel so that there is free flow of the fuel through the filter outlet even when the engine operation is initiated during cold weather as is indicated by the arrows 66 in FIG. 1.

In the diesel fuel filter system as thus described, the heater means 48 are of simple and economical construction. The heater means is also adapted to be accommodated within filter housing means of generally conventional configuration for use with conventional replaceable filter units 38 in customary manner. Accordingly, the diesel fuel filter system is adapted to be incorporated in an engine system at relatively low cost. Further, the system is adapted to pass diesel fuel directly over and around the various thermally conducting components of the heater means so that rapid heat-transfer to the fuel is easily accomplished without requiring excessive power consumption by the heater means. The system is therefore adapted to be used without excessively overloading the power supply capacity of a diesel powered automobile.

Figure 3:
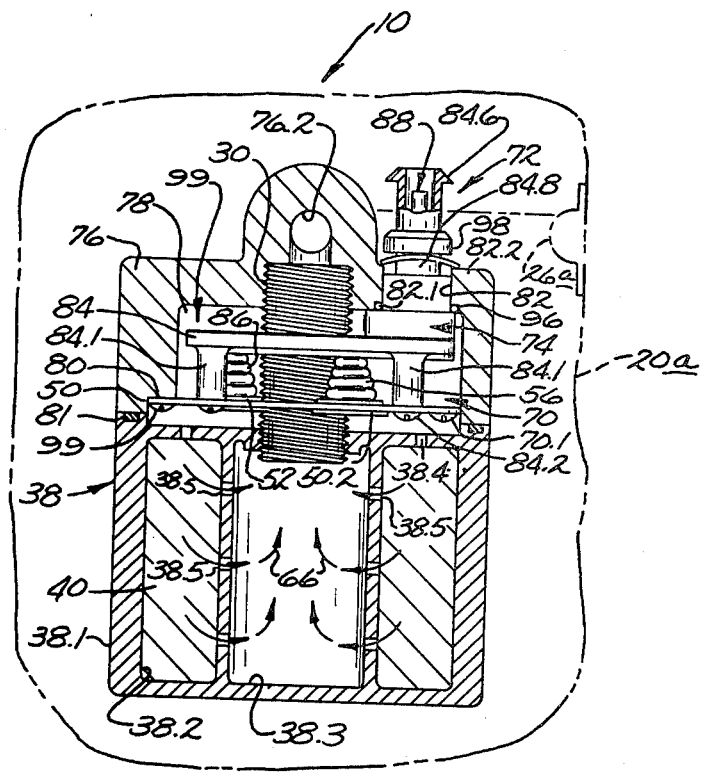
FIG. 3 is a section view similar to FIG. 1 illustrating an alternate embodiment of the diesel fuel filtering system of this invention.
Figure 4:
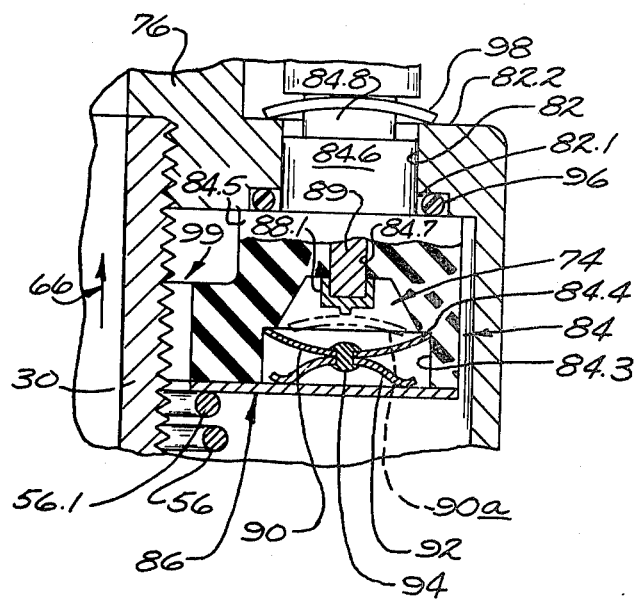
FIG. 4 is a partial section view similar to FIG. 3 to greatly enlarged scale.

In another preferred embodiment of the invention as shown in FIGS. 3 and 4, the system 68 incorporates filter means and housing means corresponding generally to those previously described with reference to FIGS. 1 and 2. In this embodiment of the invention however, the heater means 70 which are mounted in the housing means incorporate integral terminal means 72 to facilitate mounting the heater means in any conventional filter housing or the like. The system 68 also preferably incorporates thermostatic switch means 74, preferably integral with the heater means, for limiting heater operation with respect to ambient or engine temperature conditions. Preferably, the thermostatic switch means permit operation of the heater means only when ambient temperature is below a selected level. Further, the system is preferably mounted in heat transfer relation to the engine 20a by brackets 26a or the like as is diagrammatically illustrated in FIG. 3 so that, when the engine is started on a cold day, the thermostatic switch means permit initial operation of the heater means but are adapted to terminate operation of the heater means when the engine and filter system are sufficiently warmed up so that further electrical heating of the fuel in the filter means is not required. In that way, unnecessary drain on the electrical power supply capacity of the automobile engine is avoided as is excessive heating of the fuel such as might cause undesirable volatilization of the fuel on a warm day or after engine and filter warm up has occurred.

In the preferred embodiment of the system 68 as shown in FIGS. 3 and 4, the system comprises a housing part 76 having inlet means (not shown) and outlet means 76.2, having a chamber 78, having a step or shoulder 80 within the chamber, and having a gasket seat 81 substantially the same as corresponding features of the housing part 28 previously described. An externally threaded outlet tube or stud 30 is also provided on the housing part as in the system 10, and a filter unit 38 is attached to the housing part as in the system 10 previously described. In the filter system 68 however, the housing part 76 has a through aperture 82 provided therein to extend from the chamber 78 outside the housing. A gasket seat or groove 82.1 is provided on the housing part inside the chamber 78 and a retaining ring seat 82.2 is preferably provided on the exterior surface of the housing around the aperture.

In the system 68, the heater means 70 preferably comprise an annular, electrically and thermally conductive metal plate 50 having a central opening 50.1 to fit around the stud 30, having recesses 50.2 for receiving resistance heater elements 52 therein as previously described, and having selected fluid flow-through apertures 50.3 (not shown in FIGS. 3 and 4). In the system 68 however, the frame 84 is formed of a phenolic material or the like and is preferably provided with integrally molded spacers 84.1 which are attached to the annular plate 50 with mounting screws 84.2 to hold the main portion of the frame spaced over the annular plate 50. The frame or support 84 has a recess 84.3 formed in one side thereof, has a shoulder or step 84.4 formed within that recess facing toward that one side of the frame, has a boss 84.5 extending from the opposite side of the frame to be near the housing part 76 around the gasket groove 82.1, has a terminal stem 84.6 upstanding from the boss to extend through the housing aperture 82, and has a terminal opening 84.7 extending through the stem and boss into the recess 84.3. The stem preferably has a retaining ring groove 84.8 formed therein to be spaced adjacent the retaining ring seat 82.2 on the exterior of the housing when the terminal stem is extended through the housing aperture 82. The frame is provided with a conductor member 86 cemented or otherwise attached to said one side of the frame so that the conductor member preferably extends over the recess 84.3. Electrically and thermally conductive springs 56 are welded or otherwise attached in electrically conductive relation to the conductor member 86 and are electrically engaged with the respective heaters 52 as previously described with reference to FIGS. 1 and 2. A terminal stud 88 preferably having a contact tab 88.1 press fitted on the inner end thereof is fitted inside the terminal opening 84.7 in sealed relation to the frame.

In the preferred embodiment of the system 68 as shown in FIGS. 3 and 4, the thermostatic switch means 74 are preferably incorporated in the recess 84.3 in the frame so that the thermostatic switch means are integral with the heater means 70. Preferably for example, the switch means include a snap-acting thermostatic disc element 90 of a conventional type which embodies layers of metal of relatively high and low coefficients of thermal expansion metallurgically bonded together and which is adapted to move with snap action from an original dished configuration as illustrated in FIG. 4 to an inverted dished configuration (diagrammatically illustrated by the broken lines 90a in FIG. 4) in response to selected temperature changes. (Only one layer of the element 90 is shown in FIG. 4 for clarity of illustration). The perimeter of the snap-acting element 90 is rested on the step 84.4 within the frame recess and a spider spring 92 or the like is secured to the center of the snap acting element 90 by a rivet contact member 94 so that the spider spring resiliently bears against the conductive member 86 in electrically conductive relation to the member when the snap acting element is in its original configuration as shown in FIG. 4. The snap acting element is proportioned so that when it snaps to its inverted dished configuration as shown in broken lines 90a in FIG. 4 the rivet contact member 94 is electrically engaged with the terminal member 88. The spider spring 92 is also proportioned so that it retains its electrical engagement with the conductor member 86 as the snap acting element 90 moves to its inverted dished position. In that way, the thermostatic switch means 74 is movable between the open circuit position shown in FIG. 4 and a closed circuit position in response to temperature changes. That is, when the thermostatic switch means 74 are in closed circuit position, the terminal stud 88 is connected through the contact 94, the spring 92, the conductor member 86, and the spring 56 to the resistor heater elements 52 and through the plate 50 and the housing 76 to electrical ground for electrically energizing the heaters 52 as will be understood. However, when the snap acting element 90 moves to an open circuit position in response to a selected temperature change, the contact 94 is separated from the terminal stud 88 to deenergize the heater elements.

In accordance with this invention, the heater means 70 are mounted in the housing chamber 78 on the step 80 by means of screws 70.1 or the like for electrically connecting the annular plate 50 to the metal housing part 76. The terminal stem 84.6 of the frame extends through the open housing end and an O-ring gasket 96 or the like is fitted around the stem to bear against the gasket seat 82.1 and the boss 84.5 for sealing the chamber 78. A C-type split retaining ring 98 or the like is fitted over the frame stem in a retaining ring groove 84.8 as shown in FIGS. 3 and 4 to bear against the retaining ring seat 82.2 on the exterior of the housing thereby to hold the stem in the aperture 82 as will be understood.

In that arrangement, the thermostatic switch means 74 in the system 68 are normally adapted to be in open circuit position as shown in FIG. 4 when the switch means are above a selected temperature level such as 50° F. Accordingly, if operation of the diesel engine 20a is initiated when ambient temperature is above that selected level, the heater means 70 are not energized. However, if ambient temperature should drop to a lower level on the order 0° F. for example before the engine is started, the switch means 74 move to a closed circuit position so that the heater means 70 are energized whenever engine operation is initiated. Accordingly, as diesel fuel is passed through the filter housing 76 and over the heater means as indicated by the arrows 99 in FIG. 4, the fuel is heated to assure that any paraffins or other low-boiling-point constituents of the fuel which might tend to solidify at that low temperature are returned to a liquid state to pass through the filter means 38 without clogging the filter means. In the preferred embodiment of the invention, the thermostatic switch means 74 is adapted to reopen when the temperature of the switch means is increased to a selected temperature above its closing temperature. Preferably for example, the snap acting disc element 90 is adapted to move to its closed circuit position when the disc temperature falls below 20° F. and is adapted to remain in that closed position until the disc temperature is increased to 50° F. In that arrangement, when operation of the heater means 70 is initiated on a cold day as above described, the heater means remain energized until the temperature of the switch means 74 is increased to the level of 50° F. in response to heating by the heater means 70 or in response to heat-transfer from the engine 20a.

In each of the embodiments of the fuel filter system of this invention as above described, the resistance heater elements 52 preferably are proportioned to be about 0.400 inches in diameter and to have a thickness of about 0.060 inches. The disc heaters are preferably formed of a lanthanum doped barium titanate material or the like having a Curie temperature of approximately 120° C. Preferably, three to five heaters are provided in the heater means incorporated in the systems as above described, the heater elements being electrically connected in parallel as has been described. In that arrangement, the heater elements provide low initial resistance to generate a substantial amount of heat when first energized. However, the elements are adapted to display a sharply increasing, anomalous increase in resistivity as they are heated so that the heater temperature is inherently stabilized at a level generally corresponding to the Curie temperature of the resistor material. In that way, the heater means incorporated in the fuel filter systems of this invention are adapted to provide substantial heating for preventing clogging of the filter means in the system under cold weather conditions. However, the temperature of the heater means incorporated in the system is assuredly retained at a safe level to avoid excessive heating of the diesel fuel passing through the system. The system is also formed with relatively conventional low cost components and is adapted to utilize conventional replaceable filter units as will be understood.

It should be understood that although particular embodiments of the filter systems of this invention have been described above by way of illustrating the invention, this invention includes all modifications and equivalents of the disclosed embodiments falling within the scope of the invented claims.

We claim:
1. A heater system for a diesel fuel filter comprising a housing means having a chamber and having an inlet and an outlet for the chamber for permitting diesel fuel to flow therethrough to a diesel fuel filter, thermally conducting plate means, having at least one opening therein, at least one self-regulating ceramic resistance heater disc element of a material of positive temperature coefficient of resistivity secured in thermally and electrically conducting heat-transfer relation to said thermally conducting plate means so that the element and plate means form a heater means, said heater means being mounted within said housing chamber at a location intermediate the inlet and outlet thereof so that the flow of diesel fuel through the chamber between the inlet and outlet to a diesel fuel filter normally passes the fuel directly over and around the ceramic heater disc element and through said opening in said thermally conducting plate means to accomplish rapid heat-transfer to the fuel as the fuel passes toward a filter, thereby to deter clogging of such a filter by paraffin or other fuel components which may solidify in the fuel at lower temperatures, and electrically conducting means extending from the housing chamber for electrically connecting the heater means to a source of electrical power.

2. A heater system as set forth in claim 1 wherein the housing chamber has an aperture therein, the heater disc element has ohmic contact means on opposite sides thereof and has the contact means on one side thereof secured in electrically and thermally conductive relation to said plate means in heat-transfer relation thereto, and the electrically conducting means comprises terminal means extending from the housing through said aperture and means for sealing said terminal means in said housing aperture, the terminal means being arranged in the chamber so that the flow of diesel fuel through the chamber between the inlet and outlet to a fuel filter normally passes the fuel directly over and around portions of the terminal means in heat-transfer relation thereto.

* * * * *